S. ROOSA.
HARVESTER FOR PEAS, BEANS, OR THE LIKE.
APPLICATION FILED JUNE 13, 1919.

1,371,519.

Patented Mar. 15, 1921.

Witnesses
J. H. Crawford

Inventor
Samuel Roosa
By William D. Deane
his Attorney

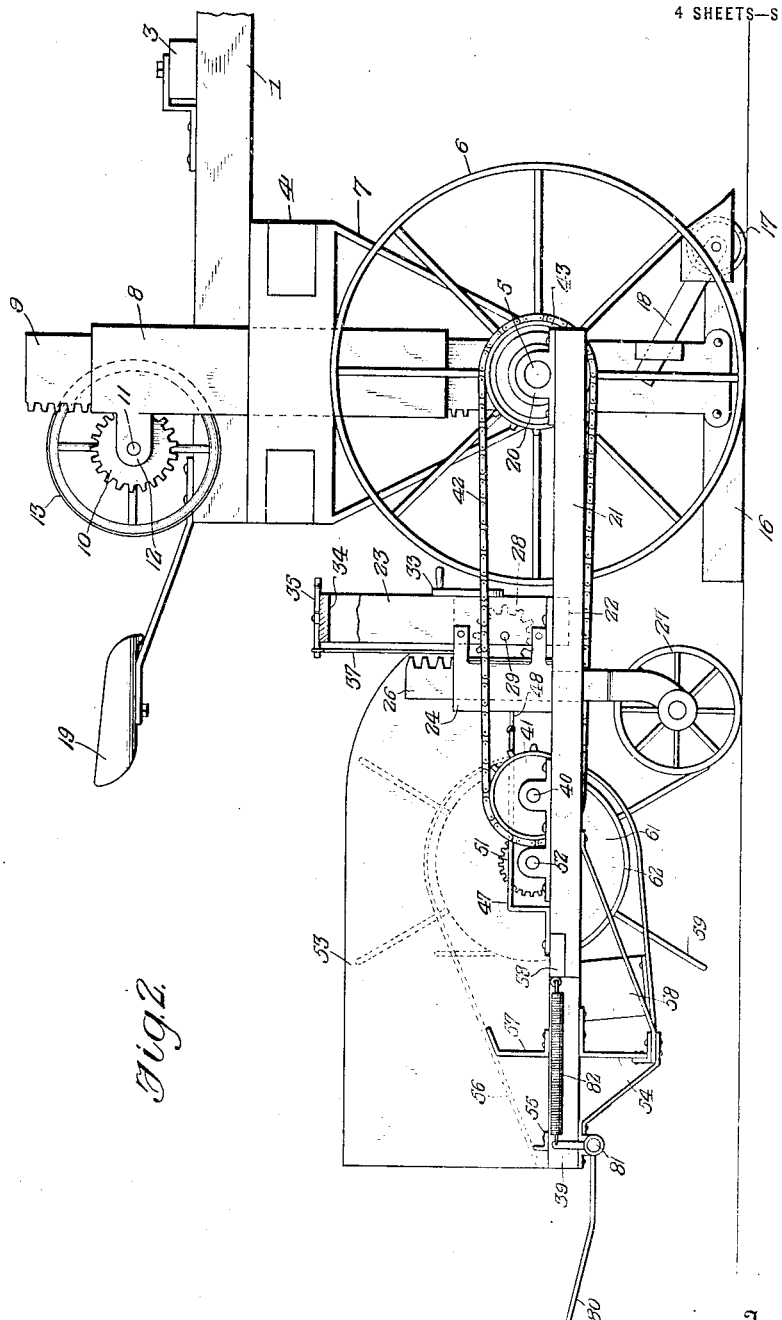

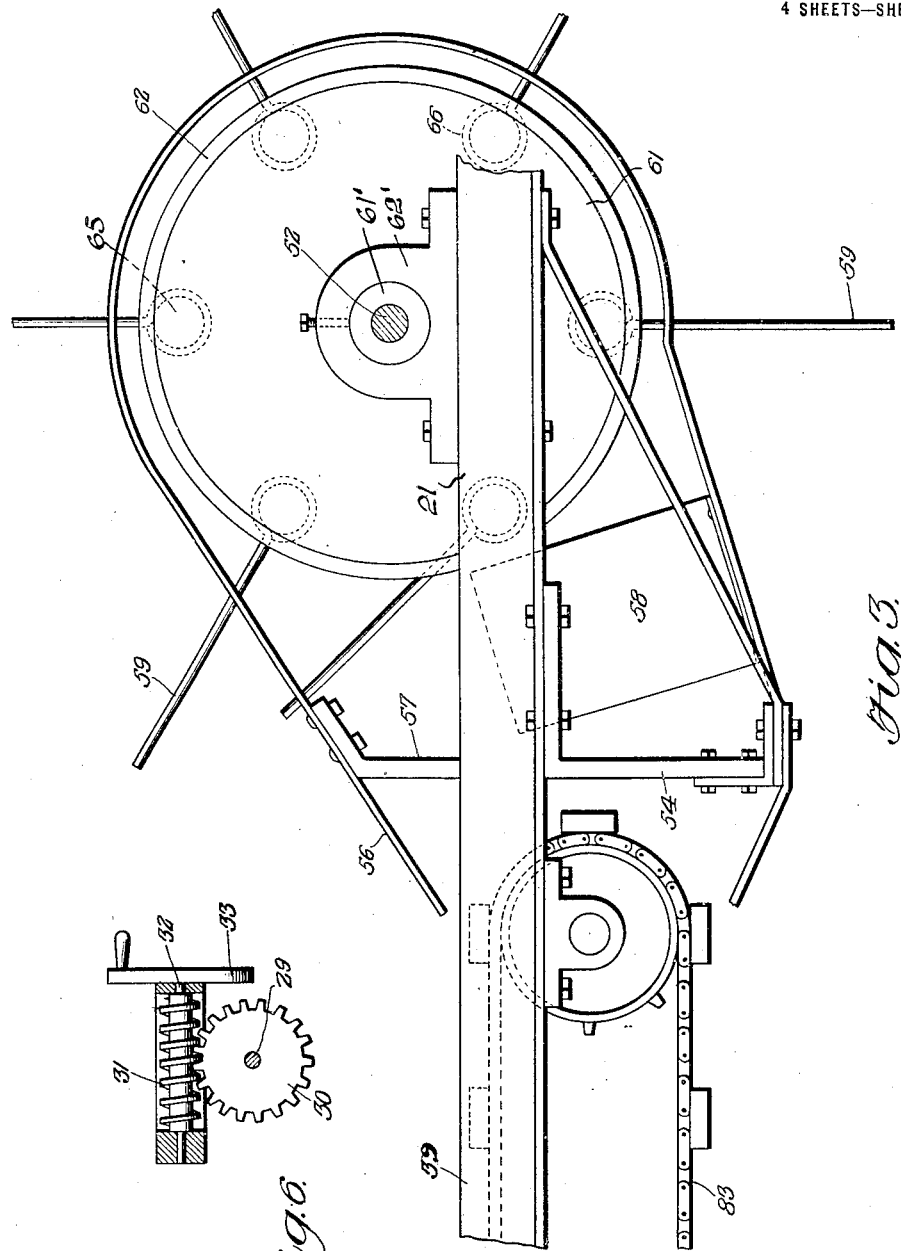

S. ROOSA.
HARVESTER FOR PEAS, BEANS, OR THE LIKE.
APPLICATION FILED JUNE 13, 1919.
1,371,519.
Patented Mar. 15, 1921.
4 SHEETS—SHEET 4.
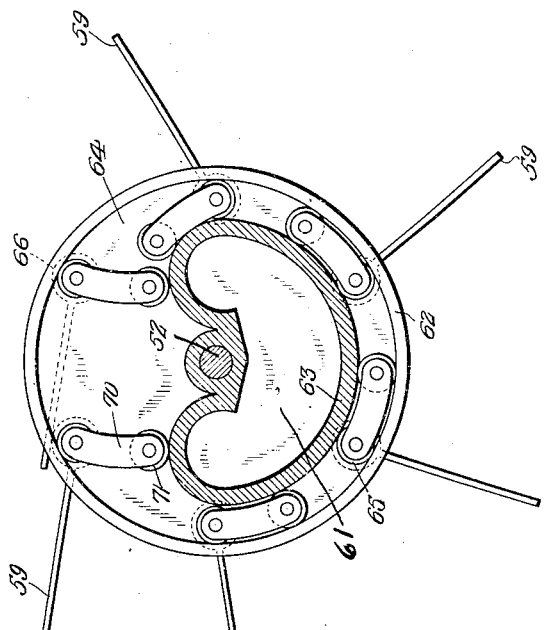
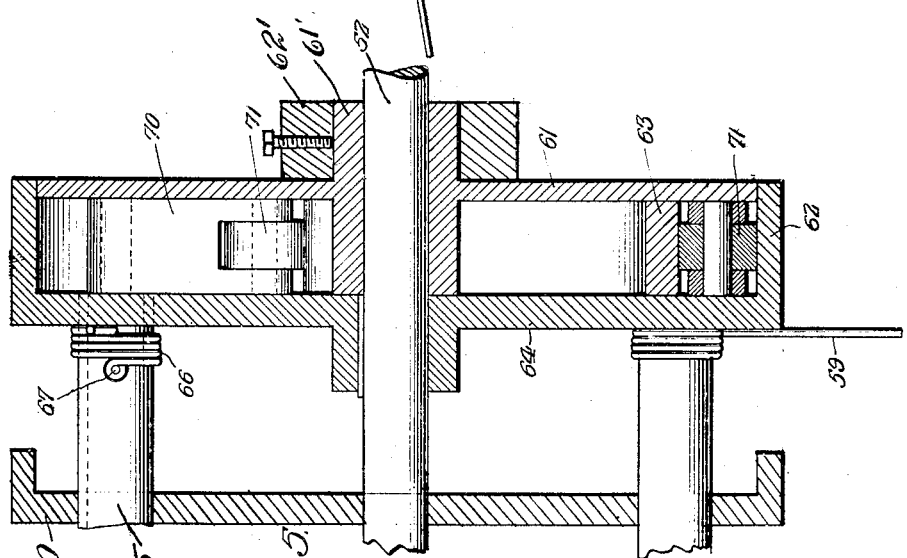
WITNESSES
J. H. Crawford
INVENTOR.
Samuel Roosa
BY William D. Jane
his ATTORNEY.

UNITED STATES PATENT OFFICE.

SAMUEL ROOSA, OF OWOSSO, MICHIGAN.

HARVESTER FOR PEAS, BEANS, OR THE LIKE.

1,371,519.  Specification of Letters Patent.  Patented Mar. 15, 1921.

Application filed June 13, 1919. Serial No. 303,894.

*To all whom it may concern:*

Be it known that I, SAMUEL ROOSA, citizen of the United States, residing at Owosso, in the county of Shiawassee and State of Michigan, have invented certain new and useful Improvements in Harvesters for Peas, Beans, or the like, of which the following is a specification.

My present invention has for its general object to provide a machine for the harvesting of beans, peas and peanuts that is dust-proof, practically free of friction in operation, susceptible of quick and easy adjustment, and adapted when properly adjusted to work to advantage even when adverse conditions are encountered.

To the attainment of the foregoing the invention consists in the general construction and combination, certain sub-combinations, and the adaptation of parts as hereinafter explicitly described and definitely pointed out in my appended claims.

In the accompanying drawings, hereby made a part hereof:

Fig. 2 is a side elevation of the same.

Fig. 3 is an enlarged detail view illustrative of the pick-up means constructed in accordance with my invention.

Fig. 4 is an enlarged detail view of the cam arrangement included in the novel pick-up means.

Fig. 5 is a view of the same, taken at right angles to Fig. 4.

Fig. 6 is a detail view of the adjustable means for the trailing ground wheels 27.

Similar numerals of reference designate corresponding parts in all of the views of the drawings.

Figure 1:
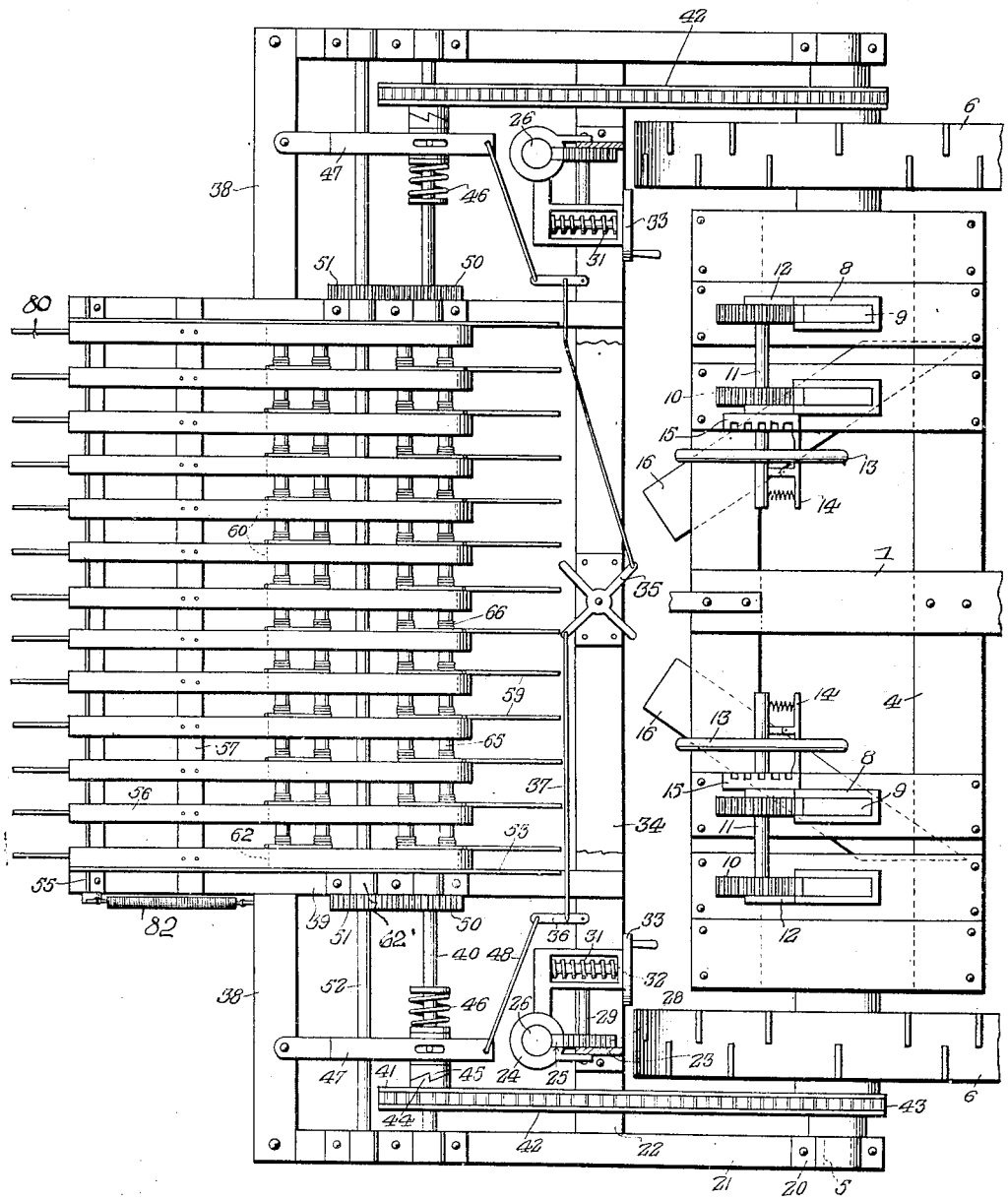
Figure 1 is a plan view of the best practical embodiment of my invention that I have as yet devised.

Reference will first be had in the detailed description to Figs. 1 and 2 wherein it will be observed that a tongue 1 bearing a doubletree 3 is fixed at its rear portion to a horizontally-disposed frame 4. The said frame 4 is spaced above stub shafts 5 on which are fixed ground wheels 6 and is supported by uprights 7 on the said stub shafts. Fixed to and extending above and below the frame 4 are vertical guide-sleeves 8 that are open at their rear sides, Fig. 1, and disposed and movable in said guide sleeves are rack bars 9, the teeth of which are on the rear edges thereof. Intermeshed with the rack bars 9 are gears 10 on transverse shafts 11 that are journaled in brackets 12 on the sleeve-guides 8 and are each equipped with a hand-wheel 13 and a detent 14 thereon. Fixed to the inner of the four sleeve-guides are vertically-disposed circular racks 15 for the engagement of the said detents 14. By virtue of this construction the rack bars 9 may manifestly be adjusted vertically and adjustably fixed with respect to the frame 4.

Carried in fixed relation at the lower ends of each pair of rack bars 9 is a pulling and bunching member 16. These pulling and bunching members 16 are arranged so as to diverge forwardly, Fig. 1, and are each provided on its forward and outer portion with a ground wheel 17 and a brace 18; the brace extending from the wheel-bearing of the member to one of the rack bars as appears in Fig. 2. Manifestly the members 16 will serve incidentally to the forward movement of the machine to pull the vines from the ground and bunch the vines; the forward divergent arrangement of the members 16 enabling the same to perform these functions without rendering the draft of the machine unduly heavy. A driver's seat 19 is connected with the rear end of the tongue.

During the forward movement of the machine the vines pass between the inner rear portions of the members 16, and then are engaged by the pick-up means hereinafter described.

Extending rearwardly from vertically-swinging axle boxes 20 in which the stub-shafts 5 are journaled are frame bars 21, and connected to and extending inwardly from the said frame bars 21 are transverse frame bars 22. Rising from the said bars 22 adjacent to the inner ends thereof are uprights 23, and fixed to the said uprights 23 are upright guide-sleeves 24, open at their forward sides as indicated by 25. The said guide-sleeves 24 are adjustable vertically on rack bars 26 that are equipped at their lower ends with trailing ground wheels 27. Intermeshed with the rack bars 26 are gears 28 on shafts 29 that are journaled in bearings on the uprights 23. These shafts 29 are equipped with worm-gears 30, and intermeshed with said worm-gears 30 are worms 31 on shafts 32 that bear hand wheels 33. Interposed between and connected with the upper portions of the uprights 23 is a crossbar 34, and mounted on the center of said bar 34 is a cruci-form lever 35, two arms of which are adapted to be engaged by the feet of the driver. At 36 are swinging arms, connected through rods 37 with the other arms of the cruci-form lever 35. 38 and 39 are transverse and longitudinal bars, respectively, which serve in conjunction with the frame bars 21 and the transverse frame bars 22 to form rectangular sub-frames best shown in Fig. 1. These sub-frames carry short shafts 40 on which are loosely mounted sprocket gears 41 connected through sprocket belts 42 with complementary sprocket gears 43 on the sub-shafts 5. At their inner sides the sprockets 41 are provided with clutch members 44, and these latter are opposed to clutch members 45 splined on the shafts 40 so as to turn therewith and slide thereon. The clutch members 45 are backed by springs 46 and are engaged by levers 47 that are connected through rods 48 with the swinging arms 36. Thus it will be seen that by manipulating the cruci-form lever 35 the driver is enabled to expeditiously and easily interrupt the driving connections between the ground wheels 6 and the short shafts 40; also, that when the cruci-form lever 35 is released the said connections will be immediately reëstablished. The short shafts 40 are provided with gears 50, and these are intermeshed with gears 51 on the transverse shaft 52 of the novel organized pick-up mechanism of the machine, which mechanism will now be described.

Carried by the inner longitudinal bars of the rectangular sub-frames hereinbefore alluded to are longitudinal guards 53, and interposed between and connected to the rearwardly extended portions of the said inner longitudinal bars are lower and upper cross bars 54 and 55. These bars 54 and 55 (Fig. 2) serve for the connections of the ends of the longitudinal and spaced spring-steel strippers 56 each of which is of general U-shape in side elevation, Fig. 3, and is braced by bar 57. It will also be observed by reference to Fig. 3 that the strippers 56 are equipped with guides 58 for the tangs 59 that move in the spaces intermediate the strippers 56 as hereinafter described.

Fixed at intervals on the transverse shaft 52 and arranged coincident with the strippers 56, Fig. 3, are supporting disks 60, and fixed with respect to the inner longitudinal bars of the rectangular sub-frames and loosely surrounding the shaft 52 are cam members 61, Figs. 4 and 5, each of which has a heart-shaped flange 63. Said cam member 61 has a sleeve or hub 61', to be clamped in a bearing box 62' and is thereby held against rotation. Keyed to the shaft 52 and opposed to the inner sides of the cam members 61 are end disks 64 having circular flanges 62. Journaled in the disks 60 and also in the disks 64 and rotatable therewith are rock shafts 65, preferably of gas pipe form. The tangs 59 are carried by these rock shafts, and by reference to Fig. 5 it will be seen that each tang 59 is provided at its heel with a spring 66 that is coiled about the shaft and is connected thereto at 67. This provision manifestly lends resiliency to the tangs and averts injury in the event of any tang encountering a stone or other obstruction. The tangs are moved in the spaces between the strippers 56 and in the spaces between the end strippers and the disks 64. At their ends the tang-bearing rock shafts 65 are equipped with cranks 70, Figs. 4 and 5, and mounted in bifurcations in the ends of these cranks are anti-friction wheels 71 that engage the flanges 62 and 63 after the manner shown in Fig. 4 with the result that during the turning of the shaft 52, disks 60 and disks 64 the tangs 59 assume the different positions indicated in Fig. 4. It will be noticed here that the cranks 70 and wheels 71 and the elements with which they coöperate are entirely inclosed and hence are dust proof; and it will also be apparent that the provision of the wheels 71 arranged as shown and described practically eliminates friction.

The vines and the beans, peas or peanuts, as the case may be, may be discharged to a toothed dropper 80, pivoted at 81 and yieldingly supported by a retractile spring 82, as in Figs. 1 and 2, or if preferred, the vines, etc., may be discharged to an endless conveyer 83 with belts and cross-slats, as in Fig. 3, to be elevated to a carrier (not shown).

As will be readily understood from the foregoing the frame including the bars 21 that carry the organized pick-up mechanism may be adjusted vertically and adjustably fixed on the rack bars with which the ground wheels 27 are connected in order to adapt the machine to different conditions; also, that the pick-up mechanism is driven from the ground wheels 6 through the driving connections described.

It will be gathered from the foregoing that I have combined in a single machine efficient means for pulling and bunching the vines with an efficient organized mechanism for picking up the vines, etc., which mechanism because of its dust-proof character and its freedom from undue friction is reliable in operation and durable and is not likely to get out of order after a short period of use.

As hereinbefore set forth the construction herein shown and described constitutes the best practical embodiment of my invention of which I am aware. I do not desire, however, to be understood as confining myself to the specific construction and relative arrangement as described for the sake of clearness inasmuch as in the future practice of the invention such changes in the form and arrangement of parts may be made as fairly fall within the scope of my appended claims.

Having described my invention, what I claim and desire to secure by Letters Patent is:

1. A pick-up mechanism comprising supporting means, a shaft journaled therein, spaced supporting disks fixed on said shaft, spaced strippers connected with the supporting means and arranged coincident with the supporting disks, rock-shafts journaled in and rotatable with the supporting disks, cam members fixed to the supporting means and loosely surrounding the first-named shaft and having inwardly directed cam flanges, end disks fixed on said shaft and having circular flanges opposed to the cam members and forming with the same inclosures, and cranks fixed on the rock shafts and disposed in said inclosures and actuatable by said cam flanges.

2. A pick-up mechanism comprising supporting means, a shaft journaled therein, spaced supporting disks fixed on said shaft, spaced strippers connected with the supporting means and arranged coincident with the supporting disks, rock-shafts journaled in and rotatable with the supporting disks, cam members fixed to the supporting means and loosely surrounding the first-named shaft and having inwardly directed cam flanges, end disks fixed on said shaft and having circular flanges opposed to the cam members and forming with the same inclosures, and cranks fixed on the rock shafts and disposed in said inclosures and actuatable by said cam flanges and having anti-friction wheels in their ends and opposed to said flanges.

3. In means for the purpose described the combination of a fixed cam member, a shaft extending therethrough, a disk fixed on the shaft and opposed to the cam member and forming therewith an inclosure, rock shafts journaled in said disks, and cranks fixed to said rock shafts and disposed in said inclosure and opposed to the cam of the cam member.

4. In means for the purpose described the combination of a fixed cam member, a shaft extending therethrough, a disk fixed on the shaft and opposed to the cam member and forming therewith an inclosure, rock shafts journaled in said disk, and cranks fixed to said rock shafts and disposed in said inclosure and having anti-friction wheels mounted in their ends and opposed to the cam of the cam member.

5. The combination of supporting means, a shaft, a disk loosely surrounding said shaft and having a lateral heart-shaped flange, a disk fixed on the shaft and having a circular flange surrounding the first-named disk and forming therewith an inclosure, and tang-bearing rock-shafts journaled in the second-named disk and having cranks in the inclosure formed by the two disks and also having anti-friction wheels mounted in the ends of the cranks and opposed to the heart-shaped flange.

In testimony whereof I affix my signature in presence of two witnesses.

SAMUEL ROOSA.

Witnesses:
W. A. SEEGMILLER,
FRANCES L. DAY.